United States Patent [19]

Bell

[11] Patent Number: 4,981,931

[45] Date of Patent: Jan. 1, 1991

[54] DISCRETE TUNGSTEN COMPLEXES AS OXYGEN AND WATER RESISTANT DCPD POLYMERIZATION CATALYSTS

[75] Inventor: Andrew Bell, New Castle, Del.

[73] Assignee: Hercules Incoporated, Wilmington, Del.

[21] Appl. No.: 315,075

[22] Filed: Feb. 24, 1989

[51] Int. Cl.$^5$ ............................................. C08F 4/78
[52] U.S. Cl. ................................. 526/166; 526/283; 526/169; 502/102
[58] Field of Search ............................. 526/166, 169

[56] References Cited

U.S. PATENT DOCUMENTS

| | | | |
|---|---|---|---|
| 4,550,216 | 10/1985 | Basset et al. | 585/645 |
| 4,598,102 | 7/1986 | Leach | 526/169 X |
| 4,729,976 | 3/1988 | Sjardijin et al. | 502/102 |
| 4,826,942 | 5/1989 | Nelson | 526/169 X |

FOREIGN PATENT DOCUMENTS

| | | |
|---|---|---|
| 222432 | 5/1987 | European Pat. Off. . |
| 259215 | 8/1987 | European Pat. Off. . |

OTHER PUBLICATIONS

Journal of Inorganic Chemistry, Aryloxide Ligands in the Metathesis of Olfins: Synthesis of $W(OAr)_xCl_{6-x}$ Complexes with X=2, 3, and 4, Crystal Structures of $W(O-2,6-C_6H_3-i-Pr_2)_3Cl_3$ and $W(O-2,6-C_6H_3Ph_2)_2Cl_4$; 1987, vol. 26, pp. 4272–4277.
Chemical Abstracts, vol. 74, 1971, p. 40.
Die Angewandte Makromoleculare Chemie 14; (1970) 87–109 (Nr. 202).

Primary Examiner—Patrick P. Garvin
Attorney, Agent, or Firm—Mark Goldberg

[57] ABSTRACT

This invention is a process for preparing a polymer which comprises contacting pure dicyclopentadiene with a pure tungsten catalyst complex, such as $WCl_3(2,6\text{-diisopropylphenoxy})_3$, when tributyl tin hydride or triphenyl tin hydride is used as the activator for the polymerization. This process affords a method of polymerization of dicyclopentadiene in which the mixture gels slowly without the use of a rate moderator at 80° C. (in from about 15 seconds to as much as two minutes or more) and furthermore cures quite slowly (in about 3–6 minutes). This delay makes these compositions particularly applicable to reaction injection molding processes. Moreover, both the tungsten complexes and the tin activator compounds employed in this invention are relatively insensitive to oxygen and water.

6 Claims, No Drawings

DISCRETE TUNGSTEN COMPLEXES AS OXYGEN AND WATER RESISTANT DCPD POLYMERIZATION CATALYSTS

FIELD OF THE INVENTION

This invention is a process for the bulk polymerization of strained ring non-conjugated polycyclic cycloolefins, especially dicyclopentadiene, the polymer prepared by this process and the catalyst system used in the process.

BACKGROUND OF THE INVENTION

Preparation of thermoset cycloolefin polymers via metathesis catalysts is a relatively recent development in the polymer art. Klosiewicz, in U.S. Pat. Nos. 4,400,340 and 4,520,181, teaches preparation of such polymers from dicyclopentadiene and other similar cycloolefins via a two-stream reaction injection molding technique wherein a first stream, including the catalyst, and a second stream, including a catalyst activator, are combined in a mix head and immediately injected into a mold where, within a matter of seconds, polymerization and molding to a permanently fixed shape take place simultaneously.

In the presence of a metathesis catalyst system, polymerization takes place extremely rapidly even at low temperatures. In fact, polymerization occurs so rapidly that it is not unusual for the monomer to polymerize to a solid immobile condition before the mixed streams can be transferred to the mold. To overcome this difficulty, Klosiewicz teaches the inclusion of a reaction rate moderator in the activator stream to delay the catalyst activation until the reaction mass is totally within the mold. The total time from mixing until polymerization is substantially complete is still just a matter of seconds. The present invention is concerned with a method of producing such a delay in polymerization with a different catalyst system than the one employed by Klosiewicz and one which requires fewer components than the prior art systems.

In the typical system, according to Klosiewicz, the catalyst component is a tungsten or molybdenum halide and the activator is an alkyl aluminum compound. The reaction rate moderator can be, e.g., an ester, ether, ketone or nitrile. The present invention does not require the addition of the reaction rate moderator when tin activator compounds are employed. More recently, in patent application Ser. No. 250,209 it was disclosed that the activator compound could be a dialkyl zinc compound.

Most strained ring non-conjugated polycyclic cycloolefins are metathesis polymerizable. These include, for example, dicyclopentadiene, higher cyclopentadiene oligomers, norbornene, norbornadiene, 4-alkylidene norbornenes, dimethanooctahydronaphthalene, dimethanohexahydronaphthalene and substituted derivatives of these compounds. The preferred cyclic olefin monomer is dicyclopentadiene or a mixture of dicyclopentadiene with other strained ring hydrocarbons in ratios of 1 to 99 mole % of either monomer, preferably about 75 to 99 mole % dicyclopentadiene.

The metathesis catalyst system is comprised of two parts, i.e., a catalyst component and an activator. The preferred catalyst component as taught by Klosiewicz has been a tungsten halide, and preferably a mixture or complex of tungsten hexachloride ($WCl_6$) and tungsten oxytetrachloride ($WOCl_4$). A different tungsten halide catalyst is used in the present invention.

The tungsten or molybdenum compound is not normally soluble in the cycloolefin, but can be solubilized by complexing it with a phenolic compound. Preferred phenolic compounds include phenol, alkyl phenols, halogenated phenols or phenolic salts such as lithium or sodium phenoxide. The most preferred phenolic compounds are 2,6-di-tert-butyl-p-cresol (BHT), 2,6-diisopropylphenol (DIPP), 2,6-dichlorophenol, t-butyl phenol, t-octyl phenol and nonyl phenol. The preferred phenolic compound for complexing the tungsten compounds in the present invention is 2,6-diisopropylphenol.

Recently, Basset et al. in The Journal of Inorganic Chemistry, Vol. 26, No. 25, pp. 4272–4277, (1987) and in European Patent Appl. EP No. 259,215, Mar. 9, 1988 taught the preparation of a tungsten catalyst having the formula

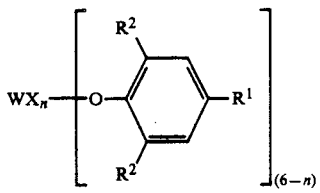

where X is Cl or Br, n is 2 to 4, $R_1$ is a hydrogen, alkyl group, phenyl, or an alkoxy group 1 to 8 carbon atoms in length and $R_2$ is a hydrogen or a bulky alkyl group 3 to 9 carbon atoms in length. For example, the $W(OAr)_3Cl_3$ complex was produced through the reaction of $WCl_6$ with 4 equivalents of 2,6-dimethyl or 2,6-diisopropyl disubstituted phenol in carbon tetrachloride. A mixture of $W(OAr)_3Cl_3$ and $W(OAr)_2Cl_4$ compounds is produced which may be easily separated due to the large difference in their solubilities in the reaction medium. The synthesized compounds were black solids (dark red-purple in solution), stable in air at room temperature, insoluble in pentane, hexane and alcohols but soluble in aromatic and chlorinated solvents. Basset et al. also disclose the preparation of a variety of other tungsten complexes. In the Basset et al. European application the use of a variety of cocatalysts or activator compounds was reported in the polymerization of dicyclopentadiene including $SnR_4$, $R_3Al$, $R_2AlX$ and $RAlX_2$, where R is an alkyl group and X is a halogen. Although Basset et al. listed a variety of cocatalysts, the experimental results reported were with $C_2H_5AlCl_2$ and $(C_2H_5)_2AlCl$. Applicant has found that the aluminum compounds do not provide an adequate exothermic polymerization reaction when used with the tungsten catalyst compounds of this invention to polymerize pure DCPD.

Sjardijn et al. disclosed in U.S. Pat. No. 4,729,976 that with their method, unlike prior art methods, it is not necessary to employ pure dicyclopentadiene monomer. Impure dicyclopentadiene is polymerized in bulk by tungsten catalysts in cooperation with either a trialkyl or triphenyl tin hydride complex, e.g. n-$Bu_3SnH$ or $Ph_3SnH$. The preparation of two catalysts is taught in Examples 1 and 2 of the '976 patent, which are incorporated by reference herein, as follows:

Catalyst 1, $WCl_4(DIPP)_2$, was prepared by the reaction of 1 eq. $WCl_6$+1.85 eq. DIPP. Catalyst 2, $WCl_5(BHT)$, was prepared by the reaction of 1 eq.

WCl$_6$+3.0 eq. BHT. The tungsten catalysts disclosed by Sjardijn et al. are W(OAr)$_2$Cl$_4$ and W(OAr)Cl$_5$. A desirable feature of the Sjardijn et al. invention is that it employs a tin compound such as trialkyl or triphenyltin hydride as the second component of the two component catalyst system. Such tin compounds are less sensitive to water and oxygen contamination than the aluminum compounds that have been used as activators in polymerization systems such as described by Klosiewicz.

However, it has been found that when the tin compounds of Sjardijn et al. (in particular, tributyltin hydride) are used with Sjardijn's Catalyst 1 or Catalyst 2 to polymerize pure dicyclopentadiene, there is almost instantaneously an extremely rapid gelation of the mixture and concomitant exothermic polymerization. A delay in gelation is necessary to prevent polymerization until the mold has been filled. In producing molded polymeric articles, it is preferred to use pure dicyclopentadiene monomer rather than the impure monomer used by Sjardijn et al. due to considerations of predictability of polymer properties.

This invention provides a process to employ Sjardijn et al's tin compounds and other activator compounds in a system in which gelation and polymerization are delayed for at least a time sufficient to charge the reaction mixture to a mold. Both the catalyst and activator compounds have improved stability with resistance to oxygen and moisture. The catalyst compounds used in this invention are easy to isolate, instead of being mixtures as are those found in the prior art. In addition, delays in gel and cure time are obtained without the need for addition of a rate moderator compound.

SUMMARY OF THE INVENTION

This invention is a process for preparing a polymer which comprises contacting pure dicyclopentadiene with a substantially pure tungsten complex, having the formula

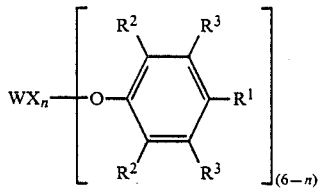

where X is Cl or Br, n is 2 or 3, $R^1$ is a H, a Cl or an alkyl group having 1 to 10 carbons, an alkoxy group having 1 to 8 carbons or a phenyl group, $R^2$ is H or an alkyl group having 1 to 9 carbons and $R^3$ is a H or an alkyl group having 1 to 10 carbon atoms; and contacting said pure dicyclopentadiene with tin activator compound having the formula, $R_3SnH$, where R is an alkyl group having 1 to 10 carbon atoms, or a phenyl group. This process affords a method of polymerization of dicyclopentadiene in which the mixture gels slowly at 80° C. (in from about 15 seconds to as much as two minutes or more) and furthermore cures quite slowly (in about 2 to 10 minutes) at 80° C. This delay makes these compositions particularly applicable to a variety of molding processes. Moreover, both the tungsten complexes and the tin activator compounds are insensitive to oxygen and water.

DETAILED DESCRIPTION OF THE INVENTION

In accordance with this invention, it has been found that the onset of gelation or viscosity build-up of pure metathesis polymerizable strained ring non-conjugated polycyclic cycloolefins such as dicyclopentadiene higher cyclopentadiene oligomers, norbornene, norbornadiene, 4-alkylidene norbornenes, dimethanooctahydronaphthalene, dimethanohexahydronaphthalene, substituted derivatives of said monomers and mixtures thereof at temperatures up to at least about 80° C. can be significantly delayed by employing a tungsten catalyst complex having the formula

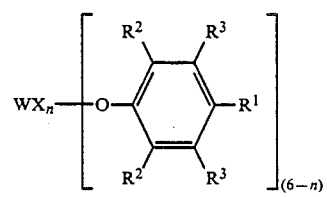

where X is Cl or Br, n is 2 or 3, $R^1$ is a H, a Cl, an alkyl group having 1–10 carbons, an alkoxy group having 1 to 8 carbons, or a phenyl group $R^2$ is H or an alkyl group having 1 to 9 carbon atoms and $R^3$ is a H or an alkyl group having 1 to 10 carbon atoms together with a tin activator compound having the formula, $R_3SnH$, where R is an alkyl group having 1 to 10 carbon atoms, or a phenyl group.

The alkoxy groups $R_1$ can correspond to the following formulas:

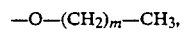

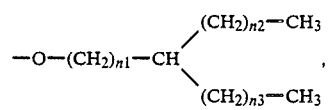

wherein m is between 0 and 7, $n_1$, $n_2$ and $n_3$ are integers, equal or different, between 0 and 5 wherein the sum of the three integers is between 0 and 5 inclusive,

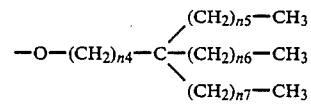

wherein the numbers $n_4$, $n_5$, $n_6$, $n_7$ are equal or different, between 0 and 4 inclusive and the sum of the four numbers is between 0 and 4 inclusive. The bulky alkyl groups of $R_2$ can be for example isopropyl, isobutyl, tert-butyl, iso-amyl, tert-amyl or similar groups. The structure may be for example

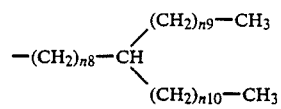

where $n_8$, $n_9$, $n_{10}$ represent integers, equal or different between 0 and 6 with the sum of the three numbers no greater than 6. Other examples of $R_2$ may be represented by the formula

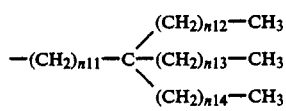

wherein $n_{11}, n_{12}, n_{13}, n_{14}$ are integral numbers the sum of which is no greater than 5.

The two $R^2$ groups are generally bulky but do not have to be identical. The $R^2$ groups may also be methyl groups. The tungsten catalyst complex is prepared in a manner similar to the method disclosed by Basset et al. in the paper referenced above. Among the tungsten catalyst complexes that may be employed in this invention are $WCl_2$(4-ethoxyphenoxy)$_4$, $WCl_2$(4-butoxyphenoxy)$_4$, $WCl_3$(2,6-di-tert-butylphenoxy)$_3$, $WCl_2$(phenoxy)$_4$, $WCl_2$(3-methylphenoxy)$_4$, $WCl_2$(4-methylphenoxy), $WCl_2$(3,5-dimethylphenoxy)$_4$, $WCl_2$(4-butylphenoxy)$_4$, $WCl_2$(4-chlorophenoxy)$_4$, $WCl_3$(2,6-dimethyl phenoxy)$_3$, $WCl_3$(2,4,6-trimethylphenoxy)$_3$, $WCl_2$(4-phenyl phenoxy)$_4$, $WCl_2$(4-methoxyphenoxy)$_4$, and $WCl_3$(2,6-di-isopropylphenoxy)$_3$.

Of the trialkyl tin hydrides, suitable for use in the process of the invention, tri-n-butyltin hydride is preferred. Triphenyltin hydride may also be used.

As stated already hereinbefore the DCPD monomer is of a highly pure grade, containing less than 1% impurities. The DCPD used in the following examples was about 99.4% pure monomer.

When the two parts of the catalyst system, the tungsten catalyst and the tin activator, are combined the resulting cycloolefin (for example, DCPD) to catalyst compound ratio will be from about 500:1 to about 15,000:1 on a molar basis, preferably 2000:1 and the molar ratio of the tungsten complex versus the tin activator compound will be from about 1:2 to 1:6.

Generally the polymerization takes place in bulk, but the catalyst components may be dissolved in a small amount of solvent, such as toluene. It is preferred, however, to use DCPD as a solvent. Since the tri-n-butyl tin hydride activator compound is a liquid, no solvent is necessary for its addition and the triphenyltin hydride is readily soluble in DCPD.

A preferred method for the polymerization of DCPD is to contact a tungsten compound catalyst component stream with a tin compound activator component stream wherein at least one of the streams contains the DCPD and to polymerize the DCPD. For example it is possible to dissolve the tungsten catalyst in DCPD and either to dissolve the tin activator in DCPD or in another solvent or to use the tin activator without any solvent. Usually both the tungsten catalyst and the tin activator are first dissolved in separate streams of DCPD prior to the mixture of said streams.

After the streams have contacted with each other the resulting mixture may be injected or poured into a mold, where the polymerization takes place. The polymerization is exothermic, but heating the mold from about 50° to 100° C. is preferred.

The tin activator as well as the tungsten catalyst may be stored in DCPD for some time, provided that the DCPD contains only a few ppm of water or less. The tin activator is storable in DCPD for prolonged periods without losing its activity.

During the polymerization of DCPD various additives can be included in the reaction mixture to modify the properties of the polymer product of the invention. Possible additives include fillers, pigments, antioxidants, light stabilizers, plasticizers and polymeric modifiers.

Due to the low viscosity of this system and the significant delay obtained in the gel and cure of the polymer, this polymerization is particularly suited techniques where molds are filled slowly. For example, the mixture can be employed in rotational molding where centrifugal force is employed to distribute the mixture and where the polymerization reaction cannot start until uniform distribution is achieved. The mixtures are also useful in preparing polymer articles filled with glass or other fibrous mat reinforcement where the mixture must remain fluid until it has completely impregnated the mat. Manufacture of large objects, where the volume of the mold, per se, necessitates long filling time, can also be facilitated by using the moderators of this invention.

The invention further relates to a two component catalyst system, comprising.

(a) a tungsten compound of the formula $WCl_3(OAr)_3$ or $WCl_2(OAr)_4$ wherein Ar represents a phenyl group having bulky alkyl or alkoxyl groups in the 2,6 position, i.e. diisopropyl or tert-butyl group and (b) a tin compound which is either a triphenyl tin hydride or a trialkyl tin hydride, preferably a tributyl tin hydride. The phenyl group of the tungsten compound may have other substituents as disclosed herein.

In the following examples the time from mixture of the two DCPD solutions until formation of a non-fluid gel was noted and recorded as the gel time. Similarly the time from mixture of the solutions until the temperature reached 100 degrees Celsius above the constant bath temperature or ambient temperature was noted and recorded as the induction time or cure time.

In addition to measuring gel and cure times and residual DCPD monomer level, a measurement of swell value was made. The swell value is an indication of the degree of crosslinking in the polymer i.e. lower swell values indicate high degree of crosslinking. The general procedure used for swell value determinations is as follows: A 5 g sample of polymer is removed from its test tube (by breaking the glass) and carefully sliced into 1-2 mm thick sections across the cylindrical axis with a tile cutter. The burrs are removed, each slice weighed to the nearest milligram and strung onto a stainless steel or copper wire taking care to keep them in known sequence. This is done for each sample at a given monomer feed. The wire is made into a closed loop and placed in 50 ml of toluene for each gram of polymer. These flasks are then heated to reflux for 16 hours (overnight) and cooled. Each loop is successively removed from the flask and placed in a small dish of fresh toluene. The slices are removed, patted dry, and weighed individually, again taking care not to disturb their sequence or to tear the swollen samples. The swell values are calculated using the following formula: swell $(\%) = (w_2 - w_1)/w_1 \times 100\%$, where $w_1$ = initial weight of polyDCPD sample and $w_2$ = weight of solvent swollen polyDCPD sample. Since the swell value is an indication of the degree of crosslinking in the polymer, low values are preferred.

The invention will be illustrated with the following examples. The examples are given for the purpose of illustration only and the invention is not to be regarded as limited to any of the specific materials or conditions used in the examples.

EXAMPLE 1 (PREPARATION OF TUNGSTEN COMPLEX)

The compound $WCl_3(2,6\text{-diisopropylphenoxy})_3$ was prepared in a manner similar to the method taught by Basset et al. The catalyst and stock solution were prepared under a nitrogen atmosphere. To 9.06 g (22.8 mmol) of $WCl_6$ suspended in 40 ml toluene was added a solution of 16.88 ml (91.2 mmol) 2,6-diisopropylphenol in 20 ml toluene. The mixture was stirred under reflux for 16 hours. Slow evaporation of the solvent to approximately half its original volume led to the deposition of small, black crystals of $WCl_3(2,6\text{-diisopropylphenoxy})_3$ (2,6-diisopropylphenoxy is abbreviated as DIPP in the following examples). About 10 grams, a 53% yield, of the crystalline material was collected, filtered, washed with a small volume of toluene, and the solid obtained was dried under reduced pressure. The complex can be recrystallized from ethanol and is stable in air at room temperature, and may even be placed in contact with water without reaction or degradation of catalyst properties.

EXAMPLE 2

In this example dicyclopentadiene (DCPD) was polymerized with the $WCl_3(DIPP)_3$ catalyst prepared in Example 1 and tri-n-butyltin hydride (n-Bu$_3$SnH) activator. A monomer solution containing the tungsten catalyst was prepared as follows. 0.603 g ($7.282 \times 10^{-4}$ mol) of the $WCl_3(DIPP)_3$ was placed in a capped and sparged reaction vessel. To this was added 100 ml of DCPD and the mixture shaken to ensure full dissolution of the catalyst. The activator component was made similarly by the addition of 0.59 ml (2.193 mmol) of n-Bu$_3$SnH to a sparged and capped reaction vessel containing 100 ml of DCPD. The final reaction ratio achieved when the two components were mixed was 2000:1:3 of DCPD:$WCl_3(DIPP)_3$:n-Bu$_3$SnH.

Polymerization of DCPD occurred when 2.5 ml of the above prepared activator containing DCPD solution was syringed into a sparged test tube containing 2.5 ml of the catalyst containing DCPD solution, the contents mixed and the test tube placed in an oil bath heated to 80° C. An exothermic polymerization was observed in which gel time was 32 seconds, cure time (time to reach 180° C.) was 5 minutes 16 seconds, maximum temperature was 186° C., swell was 141.1% and residual DCPD was 1.25%.

EXAMPLE 3

In Example 3 DCPD was polymerized with a $WCl_3(DIPP)_3$ catalyst and n-Bu$_3$SnH activator. The procedure of Example 2 was followed except that the tin activator solution was replaced by a solution which was twice as concentrated, i.e., 1.18 ml (4.387 mmol) n-Bu$_3$SnH in 100 ml DCPD. Thus, the final reaction ratio of DCPD:W catalyst:tin activator was 2000:1:6. An exothermic polymerization was observed which was somewhat faster than in Example 2. Gel time was 17 seconds, cure time to reach 180° C. was 4 minutes 18 seconds, maximum temperature was 198° C., percent swell was 130.3 and percentage of residual DCPD was 1.28.

EXAMPLE 4

In Example 4 DCPD was polymerized with $WCl_3(DIPP)_3$ catalyst and triphenyltin hydride (Ph$_3$SnH) activator. The procedure of Example 2 was followed except that the n-Bu$_3$SnH solution was replaced by a mixture of Ph$_3$SnH in DCPD, i.e., 0.78 g (2.222 mmol) Ph$_3$SnH in 100 ml DCPD. The final reaction ratio of DCPD:W catalyst:tin activator was 2000:1:3. An exothermic polymerization was observed with a gel time of 2 minutes, cure time (time to reach 190° C.) of 3 minutes 57 seconds, a maximum temperature of 220° C., 106.0% swell and 1.37% residual DCPD.

EXAMPLE 5

In Example 5 DCPD was polymerized with $WCl_3(DIPP)_3$ catalyst and triphenyltin hydride (Ph$_3$SnH) activator. The procedure of Example 4 was followed except that the n-Bu$_3$SnH solution was replaced by a mixture of Ph$_3$SnH in DCPD which was about twice as concentrated, i.e., 1.54 g (4.388 mmol) Ph$_3$SnH in 100 ml DCPD. The final reaction ratio of DCPD:W catalyst:tin activator was 2000:1:6. An exothermic polymerization was observed for which the following parameters are pertinent: gel time was 1 minute 52 seconds, cure time (time to reach 180° C.) was 3 minutes 10 seconds, maximum temperature was 225° C., swell was 115.2% and residual DCPD was 1.93%.

EXAMPLE 6

In Example 6, DCPD was polymerized with a $WCl_3(DIPP)_3$ catalyst and a diethylzinc (DEZ) activator. The procedure of Example 2 was followed except that the n-Bu$_3$SnH solution was replaced by a mixture of diethylzinc in DCPD, i.e., 1.67 ml of 1.1 molar DEZ in toluene (1.837 mmol) in 100 ml DCPD. The final reaction ratio of DCPD:W catalyst:tin activator was 2000:1:2.5 and the polymerizing solution was held at ambient temperature rather than heating in an oil bath. An exothermic polymerization was observed for which the following parameters are pertinent: the gel time was less than 1 second, cure time (time to reach 130° C.) was 31 seconds, maximum temperature was 195° C., swell was 97.1% and residual DCPD was 1.18%.

EXAMPLE 7 (COMPARATIVE EXAMPLE 1)

In Example 7 DCPD was polymerized with $WCl_3(DIPP)_3$ catalyst and triethylaluminum (Et$_3$Al) activator. The procedure of Example 2 was followed except that the n-Bu$_3$SnH solution was replaced by a mixture of triethylaluminum in DCPD, i.e., 1.16 ml of 1.9M Et$_3$Al in toluene (2.242 mmol) in 100 ml DCPD. The final reaction ratio of DCPD:W catalyst:Al activator was 2000:1:3. The mixture of $WCl_3(DIPP)_3$ and Et$_3$Al in DCPD when heated in the 80° C. oil bath gelled at 20 seconds and reached a maximum of 79° C. in two minutes and 30 seconds.

EXAMPLE 8 (COMPARATIVE EXAMPLE 2)

In Example 8 DCPD was polymerized with $WCl_3(DIPP)_3$ catalyst and diethylaluminum chloride activator. The procedure of Example 7 was followed except that the Et$_3$Al solution was replaced by a mixture of diethylaluminum chloride (Et$_2$AlCl) in DCPD, i.e., 1.22 ml of 1.8M Et$_2$AlCl in toluene (2.196 mmol) in 100 ml DCPD. The final reaction ratio of DCPD:W catalyst:Al activator was 2000:1:3. The mixture of $WCl_3(DIPP)_3$ and Et$_2$AlCl in DCPD when heated in the 80° C. oil bath gelled in 18 seconds and reached a maximum of 91° C. at four minutes three seconds.

EXAMPLE 9 (COMPARATIVE EXAMPLE 3)

In Example 9 DCPD was polymerized with WCl₃(DIPP)₃ catalyst and ethylaluminum dichloride (EtAlCl₂) activator. The procedure of Example 8 was followed except that the Et₂AlCl solution was replaced by a mixture of ethylaluminum dichloride in DCPD, i.e., 1.22 ml of 1.8M EtAlCl₂ in toluene (2.196 mmol) in 100 ml DCPD. The final reaction ratio of DCPD:W catalyst:Al activator was 2000:1:3. The mixture of WCl₃(DIPP)₃ and Et₂AlCl in DCPD gelled immediately (in less than 1 second) when admixed to give a nonhomogeneous sample which then cured (temperature reached 180° C.) in one minute 29 seconds and a maximum temperature of 216° C.

EXAMPLE 10

In Example 10 rubberized polyDCPD plaques were prepared in a reaction injection molding (RIM) machine using a WCl₃(DIPP)₃ catalyst and n-Bu₃SnH activator. Samples of polyDCPD were made by RIM processing using a University of Minnesota Micro-RIM machine. The following description illustrates the standard procedure for molding samples. First, the desired amount of WCl₃(DIPP)₃ catalyst was dissolved in the appropriate amount of Firestone 721A styrene-butadiene (SBR)-rubberized DCPD. In this case, 4.513 g of WCl₃(DIPP)₃ (5.45 mmol) was dissolved in 766.6 g of a 6% SBR-DCPD solution and 12 ml of ethylidenenorbornene (ENB) was added as a freezing point depressant to ease processing. This provided a DCPD to tungsten catalyst ratio of 1000:1. This component was placed into one of the tanks of the RIM machine. The second component or activator was prepared by adding 8.80 ml n-Bu₃SnH (32.72 mmol) to 766.2 g of 6% SBR-DCPD solution also containing 12 ml of ENB. This component was placed in the second tank of the RIM machine and provided a DCPD:tin activator ratio of 1000:6. When the two liquid streams mixed, the final ratio of DCPD:W:Sn was 2000:1:6. The mixing of the two streams was accomplished using a standard impingement type RIM mixhead and the ratio of activator/monomer solution mixed with catalyst/monomer solution was 1:1. The activator and catalyst solutions were kept at the tank temperature of about 40° C. A mold temperature of between 75° C. and 90° C. was used to produce ⅛×5×5 inch plaques, which had a cure time of about two minutes. The plaques were demolded within four minutes. Physical properties of these plaques are given below.

| Property | |
|---|---|
| Notched Izod Impact (ft lb/in) | 7.65 |
| Flexural Modulus (Kpsi) | 187.8 |
| Flexural Strength (Kpsi) | 6.36 |

| Property | |
|---|---|
| Residual Monomer (%) | 6.61 |
| Swell (%) | 188.4 |
| HDT (°C.) | 91.0 |
| Tg (°C.) | 147.0 |

I claim:

1. A process for preparing molded polymeric articles from a strained ring non-conjugated polycyclic cycloolefin monomer comprising combining said monomer with a tungsten catalyst complex having the formula

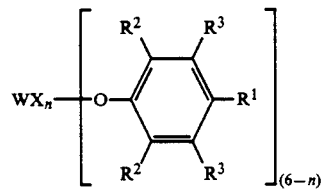

wherein X is Cl or Br, n is 2 or 3, R¹ is a H, Cl or an alkoxy group having 1 to 8 carbons, R² is H or an alkyl group having 1 to 9 carbons, and R³ is H or an alkyl group having 1 to 5 carbon atoms, with an activator compound having the formula SnR₃H wherein R is selected from the group consisting of a phenyl group and an alkyl group having 1 to 10 carbon atoms and charging said combination to a mold where polymerization will take place.

2. The process of claim 1 wherein said tungsten catalyst complex is selected from the group consisting of WCl₂(4-ethoxyphenoxy)₄, WCl₂(4-butoxyphenoxy)₄, WCl₃(2,6-di-tert-butylphenoxy)₃, WCl₂(phenoxy)₄, WCl₂(3-methylphenoxy)₄, WCl₂(4-methylphenoxy), WCl₂(3,5-dimethylphenoxy)₄, WCl₂(4-butylphenoxy)₄, WCl₂(4-chlorophenoxy)₄, WCl₃(2,6-dimethyl phenoxy)₃, WCl₃(2,4,6-trimethylphenoxy)₃, WCl₂(4-phenyl phenoxy)₄, WCl₂(4-methoxyphenoxy)₄, and WCl₃(2,6-di-isopropylphenoxy)₃.

3. The process of claim 1 wherein said activator is selected from the group consisting of triphenyl tin hydride and tri-n-butyl tin hydride.

4. The process of claim 1 wherein said cycloolefin monomer is selected from the group consisting of dicyclopentadiene, higher cyclopentadiene oligomers, norbornene, norbornadiene, 4-alkylidene norbornenes, dimethanooctahydronaphthalene, dimethanohexahydronaphthalene, substituted derivatives of said monomers and mixtures thereof.

5. The process of claim 1 wherein said monomer gels in about 15 seconds to up to 3 minutes and cures in about 2 to 10 minutes after charging the mixture of said catalyst and activator to the mold.

6. The process of claim 4 wherein said dicyclopentadiene monomer is at least 99% pure.

* * * * *